United States Patent
Conchieri

(10) Patent No.: US 6,530,224 B1
(45) Date of Patent: Mar. 11, 2003

(54) GAS TURBINE COMPRESSOR INLET PRESSURIZATION SYSTEM AND METHOD FOR POWER AUGMENTATION

(75) Inventor: John Anthony Conchieri, Greenfield Center, NY (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 09/819,882

(22) Filed: Mar. 28, 2001

(51) Int. Cl.⁷ .................................. F02C 1/00
(52) U.S. Cl. .................. 60/772; 60/39.182; 60/726
(58) Field of Search .................. 60/39.98, 39.182, 60/726, 728, 772

(56) References Cited

U.S. PATENT DOCUMENTS

| | | | |
|---|---|---|---|
| 2,584,232 A | 2/1952 | Sedille | 60/39.17 |
| 3,394,265 A | 7/1968 | Hendrickson | 290/2 |
| 3,500,636 A | 3/1970 | Craig | 60/39.03 |
| 3,747,336 A | 7/1973 | Dibelius et al. | 60/39.55 |
| 3,796,045 A * | 3/1974 | Foster-Pegg | 60/39.67 |
| 4,731,990 A | 3/1988 | Munk | 60/39.05 |
| 5,349,810 A | 9/1994 | Landalv | 60/39.02 |
| 5,353,585 A | 10/1994 | Munk | 60/39.05 |
| 5,513,488 A | 5/1996 | Fan | 60/39.05 |
| 5,537,813 A | 7/1996 | Davis et al. | 60/39.05 |
| 5,622,044 A * | 4/1997 | Bronicki et al. | 60/728 |
| 5,655,373 A | 8/1997 | Yamashita et al. | 62/728 |
| 5,669,217 A | 9/1997 | Anderson | 60/39.05 |
| 5,675,188 A | 10/1997 | Utamura | 290/52 |
| 5,680,752 A | 10/1997 | Skog | 60/39.02 |
| 5,778,675 A | 7/1998 | Nakhamkin | 60/65.2 |
| 5,782,093 A | 7/1998 | Yamashita et al. | 60/728 |
| 5,934,063 A | 8/1999 | Nakhamkin | 60/39.02 |
| 6,003,298 A | 12/1999 | Horner | 60/39.182 |
| 6,038,849 A | 3/2000 | Nakhamkin et al. | 60/39.05 |
| 6,119,445 A | 9/2000 | Bronicki et al. | 60/39.02 |
| 6,308,512 B1 * | 10/2001 | Kopko | 60/728 |
| 6,332,321 B1 * | 12/2001 | Bronicki et al. | 60/728 |
| 6,408,609 B1 * | 6/2002 | Andrepoint | 60/728 |

FOREIGN PATENT DOCUMENTS

JP        354099810 A   *  8/1979

OTHER PUBLICATIONS

Foster–Pegg R. W., "Supercharging of Gas Turbines by Forced Draft Fans with Evaporative Intercooling"., American Society of Mechanical Engineers, Jan. 7, 1965, pp 1–12.*
Foster–Pegg R.W., "Supercharging of Gas Turbines by Forced Draft Fans with Evaporative Intercooling", American Society of Mechanical Engineers, Jan. 7, 1965, pp 1–12.
Foster–Pegg R.W., "Trends in Combined Steam–Gas Turbine Power Plants in the U.S.A.", Transactions of the ASME Journal of Engineering for Power, Oct. 1966, pp 302–312.
Kolp, D.A., "Advantages of Air Conditioning and Supercharging an LM6000", Transactions of the ASME Journal of Engineering for Gas Turbines and Power, vol. 117, Jul. 1995, pp 513–527.

* cited by examiner

Primary Examiner—Charles G. Freay
Assistant Examiner—John F Belena
(74) Attorney, Agent, or Firm—NIxon & Vanderhye PC

(57) ABSTRACT

A cycle for producing pressurized gas turbine inlet conditions by capturing gas turbine exhaust waste heat, converting the heat into steam energy and applying the steam energy to drive a variable speed, supercharging fan located at the gas turbine inlet. The supercharging fan is used to increase the air mass flow rate into the gas turbine so that the gas turbine shaft horsepower can be augmented. For a simple cycle gas turbine that is not equipped with an exhaust waste heat recovery system, the invention improves the overall cycle efficiency. For combined cycle peaking applications, the variable speed, supercharging fan provides peaking output with an overall peaking efficiency that is better than the combined efficiency of a base load combined cycle plant and a peaking simple cycle plant. The invention can also improve a gas turbine power output response rate.

21 Claims, 2 Drawing Sheets

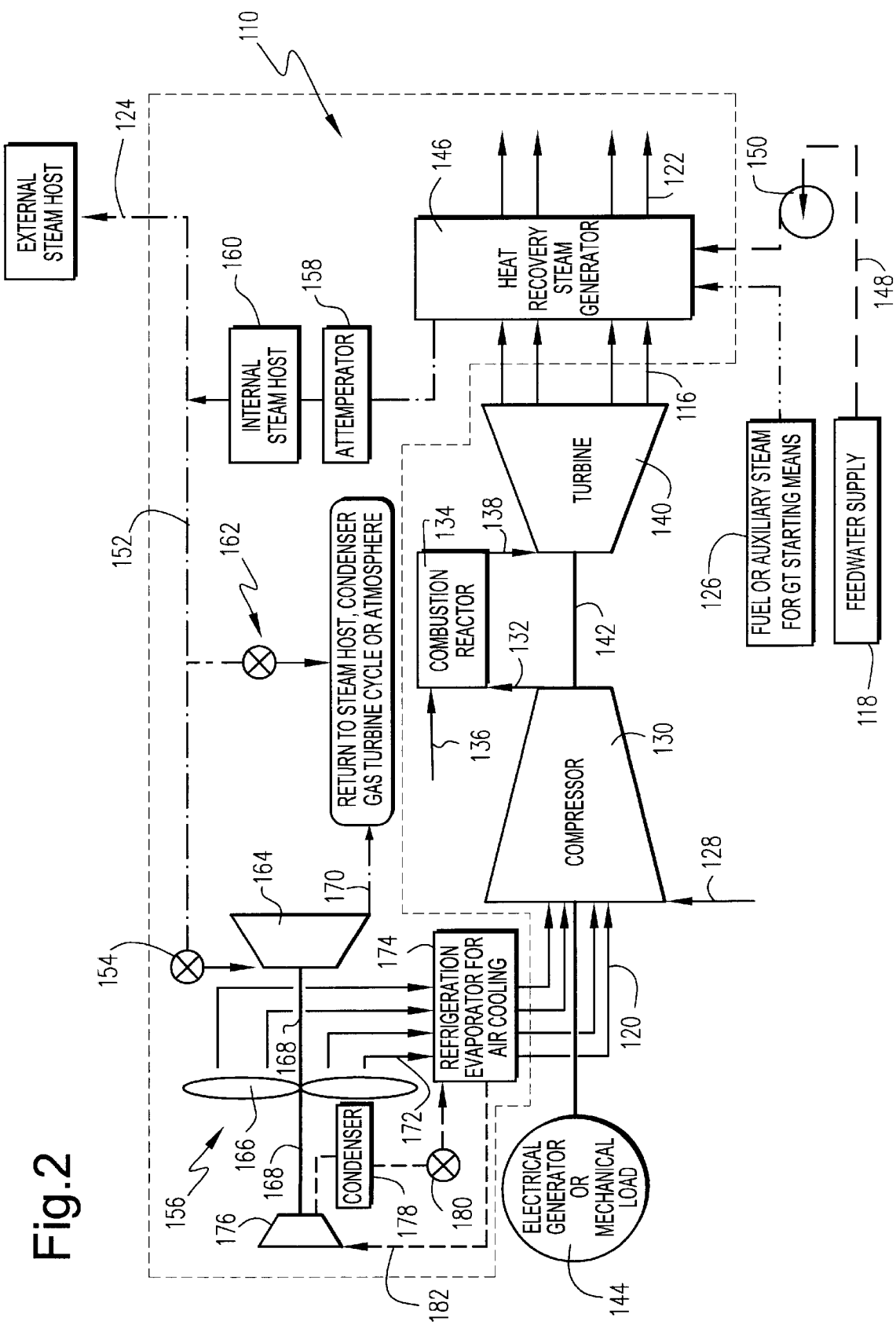

GAS TURBINE COMPRESSOR INLET PRESSURIZATION SYSTEM AND METHOD FOR POWER AUGMENTATION

BACKGROUND OF THE INVENTION

The present invention relates to a system and method for power augmentation, in particular for increasing the air mass flow rate into a gas turbine.

In gas turbine-electrical power generation applications, many power augmentation methods are available, but those methods are limited at the combustion reaction stage. More specifically, limits are imposed on increasing firing rate to within operating temperature limits; or on introducing a proportional amount of steam, vapor, water or other mediums into the gas path. Increasing the air mass flow rate into a gas turbine allows for an increase in fuel consumption, while maintaining a constant firing temperature. Increasing the air mass flow also allows for an increased injection flow rate of steam, water, vapor or other mediums into the gas path because a constant proportion of injection mass flow is maintained with respect to airflow. The theoretical machine limitations of increasing gas turbine inlet airflow are the power density through the gas turbine shaft arrangement, the pressure limits of the gas turbine casings, and the equipment being driven by the gas turbine.

Power augmentation with inlet pressurization is most beneficial for peaking operation at high ambient temperatures, where gas turbine shaft horsepower is significantly lower than its available capacity. Accordingly, power augmentation methods are normally applied to gas turbine generators used for peaking, load cycling and daily stop/start load demand profiles. Under these conditions, the gas turbine generator electrical output, or shaft horsepower, response is rapid during the start-up cycle and for adjusting output to reflect the load demand on the power transmission system. In general, existing facilities can only make adjustments from rated output by decreasing the inlet airflow to the gas turbine. This occurs by reducing inlet area geometry; then the gas turbine must reduce firing temperature to reflect load demand, and become less efficient as firing temperature decreases.

BRIEF SUMMARY OF THE INVENTION

As an embodiment of the invention, the air mass flow rate into the gas turbine is increased with a variable speed, supercharging fan located at the gas turbine inlet, so that the gas turbine shaft horsepower can be augmented. The gas turbine's exhaust heat is advantageously captured and converted into steam energy, which is then used to drive the variable speed, supercharging fan.

The nature of a variable speed, supercharging fan allows the gas turbine to maintain a maximum rated firing temperature, while being able to adjust the electrical output as a function of varying the supercharging fan speed. Applying variable pitch fan blades or fan propellers can further enhance the range of operation at maximum firing temperature. In comparison with existing gas turbine generator facilities, which can only make adjustments from rated output by decreasing the inlet air flow to the gas turbine, this is significant if dispatched for load cycling operation.

In addition, the rate of change of power output with a variable speed drive, supercharging fan in operation is not constrained by a thermal strain, power output control rates limiter. Again, this results from maintaining constant firing temperature and not imposing thermal transients on hot gas path parts. The gas turbine power output can change as a function of the acceleration and deceleration rate of the supercharging fan. A supercharging fan can take less than 10 seconds to accelerate or decelerate between idle speed and full speed. During an emergency start-up cycle the gas turbine generator output can dispatch with a rapid boost and power output from the supercharging fan.

Thus, the invention is embodied in an inlet pressurization system for augmenting power produced by a gas turbine system of the type including a compressor, a combustor for heating the compressed air, and a turbine for converting the energy of the hot combustion gases to work for driving the compressor and for supplying a load, the system comprising: a heat exchanger for evaporating and/or superheating a working fluid using the hot exhaust gases from the gas turbine; a supercharging fan operatively coupled to the compressor for augmenting air supply to the compressor; and an apparatus for converting energy of the superheated working fluid to shaft power for driving the supercharging fan. In one embodiment, a steam turbine drives the supercharging fan.

In an exemplary embodiment, the supercharging fan is a variable speed supercharging fan and/or the supercharging fan may have variable pitch blades.

According to a further feature of the invention, an assembly is provided to cool airflow downstream of the supercharging fan and upstream of the compressor inlet.

The invention is further embodied in a method for augmenting the power produced by a gas turbine system of the type having a compressor, a combustor, and a turbine converting the energy of the combustor hot gases to work for driving the compressor and for supplying a load, the method comprising feeding a working fluid to a heat exchanger that receives hot exhaust gases from the turbine for evaporating and/or superheating the working fluid; converting energy of said superheated working fluid into mechanical shaft horsepower; driving a supercharging fan with the mechanical shaft horsepower to generate an airflow; and directing the airflow into the compressor thereby increasing the flow of air into the inlet of the gas turbine to increase power density through the gas turbine to produce more shaft horsepower.

In an embodiment of the method of the invention, the airflow is cooled before being directing into the compressor.

In an exemplary embodiment, furthermore, the method further comprises varying fan speed to change shaft horsepower of the gas turbine while maintaining a nominal gas turbine firing temperature.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which:

FIG. 2 is a schematic illustration of a gas turbine generator and a pressurization system according to another embodiment of the invention.

DETAILED DESCRIPTION OF THE INVENTION

Figure 1:
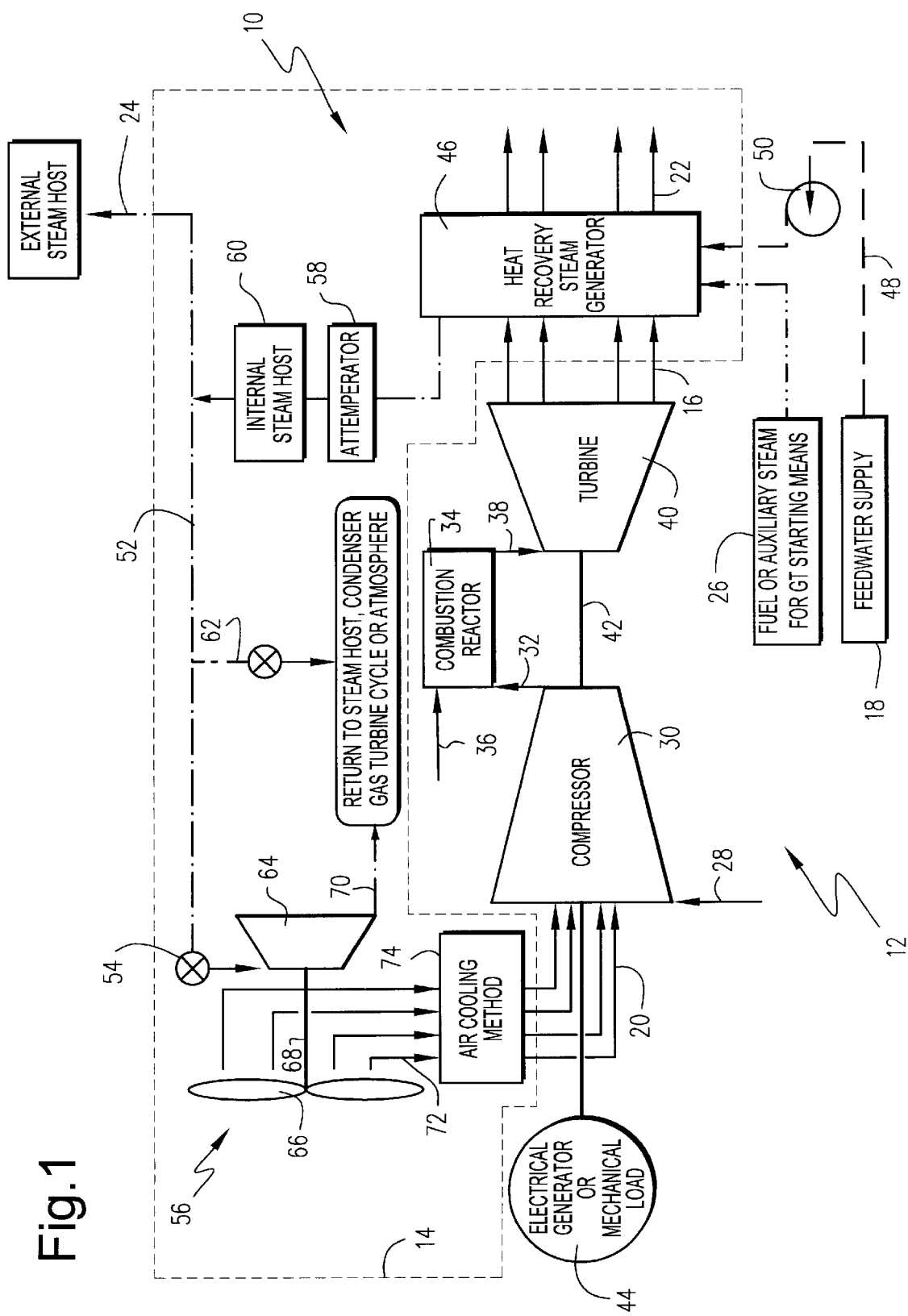
FIG. 1 is a schematic illustration of a gas turbine generator and primary elements of an exemplary pressurization system embodying the invention.

The present invention is adapted to provide daily, stop/start, peaking power generation facilities that use gas turbine technology with an assembly for increasing peak operating efficiency and improving power output loading response rates. More specifically, the present invention provides a system and process for capturing gas turbine exhaust heat, transferring that energy into a working fluid for shaft power to drive a variable supercharging fan for the purpose of gas turbine inlet pressurization, where the system design is autonomous to the sustained operation of the gas turbine equipment package.

FIG. 1 illustrates an inlet pressurization system 10 embodying the invention associated with a gas turbine system 12. For illustrative purposes, a boundary 14 is illustrated between the gas turbine generator and the primary elements of the pressurization system. This boundary is the control volume to the system and has atmospheric air (not labeled), gas turbine exhaust heat 16 and a working fluid 18, such as supply water, as the three system import streams. Cooled, supercharging fan discharge air 20, exhaust heat 22 leaving the steam generator and a variety of different steam hosts 24 are the export streams. In the illustrated embodiment, air is depicted with a single, continuous line, water is depicted with a dashed line and steam is depicted with a dash-dot line. A fuel or auxiliary steam import stream 26 is illustrated as an optional feature to allow an energy input to the heat recovery element for turbine starting purposes and/or additional steam generation as explained hereinbelow.

A generally conventional simple cycle gas turbine 12 is illustrated in FIG. 1. Thus, in the illustrated embodiment, air 28 enters the axial flow compressor 30. The thus produced compressed air 32 enters the combustion system 34 where fuel 36 is injected and combustion occurs. The combustion mixture 38 leaves the combustion system 34 and enters the turbine 40. In the turbine section, energy of the hot gases is converted into work. This conversion takes place in two steps, the hot gases are expanded and a portion of the thermal energy is converted into kinetic energy in the nozzle section of the turbine. Then, in the bucket section of the turbine, a portion of the kinetic energy is transferred to the rotating buckets and converted to work, e.g. rotation of shaft 42. A portion of the work developed by the turbine is used to drive the compressor 30, whereas the remainder is available for, e.g., an electrical generator or mechanical load 44. Hot exhaust gas 16 leaves the turbine and flows to a heat recovery unit 46. The heat recovery unit may take the form of any one of a variety of known heat exchange systems including, for example, an exhaust heat boiler or an otherwise conventional heat recovery steam generator (HRSG).

The gas turbine's exhaust heat 16 enters a pressurized working fluid supply in the heat recovery unit. In the illustrated embodiment, feed water 48 from working fluid/feed water supply 18 is pressurized, e.g., by pump 50, and evaporates and superheats in heat exchange unit 46 above saturation temperature to produce high quality steam. The superheated steam 52 flows to a main control valve 54, which acts as the speed governor to a supercharging fan assembly 56. Along the supply steam transport route, additional processes can be part of the steam system. For example, steam attemperation 58 for temperature conditioning is a common process to keep the steam within material safe material limits. Attemperation occurs by mixing a stream of lower enthalpy steam or water into the main steam source. It should be noted that there are no limitations on mixing a stream of high enthalpy steam or water into the main steam source to provide additional superheat.

The steam may also be transported through internal steam host(s) 60 so that steam enthalpy reduction occurs before entering the supercharging fan speed governor 54. For example, the main source of steam can expand through a steam turbine for electrical power generation, and then be extracted to service the supercharging fan, as discussed below. Excess available steam may be diverted to an external steam host 24 or diverted through a turbine bypass system 62. The ability to divert excess available steam, that is, steam not required for the supercharging fan drive turbine, is important for the inlet pressurization control system stability.

The speed governor 54 is the primary control mechanism of the system of the illustrated embodiment. It provides a means to ramp the supercharging fan speed, up and down, to a target fan speed set point. For a constant fan speed, the set point is fixed. A control system compares the measured fan speed signal to the fixed fan speed set point. The control valve governor acts to compensate the deviation between the measured speed and set point speed. The supercharging fan speed set point action coordinates as a function of gas turbine system power output and/or gas turbine shaft speed demand. Other gas turbine control inputs can apply, but power output and shaft speeds are the primary control parameters. For example, if the gas turbine power output target set point increases, the gas turbine controller will demand increases in the supercharging fan speed set point.

As noted above, in an exemplary embodiment, once the steam passes through the supercharging fan speed control governor 54, it expands through a steam turbine drive 64. The supercharging fan can use any practical steam pressure for the steam turbine drive apparatus. The steam expands, and converts energy into mechanical shaft horsepower, which in the illustrated embodiment directly drives the supercharging fan 66 via shaft 68. The steam 70 exhausting from the turbine drive may be returned directly to atmosphere, injected back into the gas turbine cycle, exported to a steam host, or condensed and recirculated back to the heat recovery steam generator. It is to be understood that an alternative supercharging fan drive apparatus can be provided without departing from the invention, such as, for example, a steam rotary motor drive or a variable speed electric motor drive. Also, it is to be understood that an alternative steam/water working mass medium could be applied for transfer of heat recovery to the steam turbine or other fan drive apparatus.

Atmospheric air enters the supercharging fan through an inlet duct, allowing air to be diverted as shown at 72 to the inlet of the gas turbine. The inlet usually contains inlet treatment processes such as filtering, silencing, and/or anti-icing (not shown). The amount of airflow entering the supercharging fan is a function of the gas turbine inlet pressure and temperature, compressor inlet geometry, compressor pressure ratio, firing temperature, fixed turbine geometry and exhaust equipment losses. The supercharging fan increases the supply air at greater than atmospheric pressure, forcing more air into the inlet of the gas turbine. Therefore, the power density through the gas turbine increases to produce more shaft horsepower. The increase in inlet pressure will change as a function of fan speed. The ability to vary fan speed provides the ability to change shaft horsepower while maintaining a nominal gas turbine firing temperature. Thus, for a given, fixed gas turbine firing temperature, the range of gas turbine shaft horsepower operation is increased with the variable speed supercharging fan. However, the proposed supercharging fan is a non-integral, auxiliary feature that can be separately shut off without interrupting gas turbine operation.

The air exiting the supercharging fan will increase in temperature due to the nature of the inlet pressure increasing process. This increasing temperature reduces the amount of airflow into the gas turbine inlet. Accordingly, in order to achieve maximum inlet pressurization and airflow into the gas turbine, an integral air-cooling method 74 is advantageously included as a part of the inlet pressurization system design. Fan discharge air cooling may be achieved by any one or more of a variety of different methods.

Exemplary cooling approaches that may be applied include but are not limited to inlet fogger, evaporative cooling, electric chillers (refrigeration cycle), closed or open circuit cooling water systems, or a combination of different cooling methods for a hybrid cooling process. Suitable inlet condition methods for cooling the fan discharge air as aforementioned are in general well known. The presently preferred approach is an inlet fogger, which cools the air by mixing a water spray directly into the supercharging fan discharge air.

Another possible cooling arrangement is schematically shown in the embodiment of FIG. 2. More specifically, the inlet pressurization system 110 illustrated in FIG. 2 includes a refrigerant compressor 176 on the supercharging fan shaft 168 and integrates a common refrigeration cycle including a condenser 178, an expansion valve 180 and a refrigeration evaporator 174 for cooling the air 172 from the supercharging fan 166 upstream of the compressor 130. In the illustrated embodiment, the flowing refrigerant is designated by a short dash line 182. The remaining components of the system illustrated in FIG. 2 correspond generally to the components of the system shown in FIG. 1 and, therefore, are identified with corresponding reference numerals, incremented by 100. Because the illustrated components correspond to the respective components of FIG. 1 embodiment described in detail above, a description of the common components incorporated in FIG. 2 is omitted here.

As a further, secondary improvement afforded by the invention, the supercharging fan can be a starting means for accelerating the gas turbine shaft to ignition speed, allowing the acceleration cycle to continue until the gas turbine reaches self-sustaining operation. In this embodiment, a supplemental energy input to the heat recovery system or from an external steam process host schematically shown at 26 is required. Using the supercharging fan system 56,156 as a starting means can reduce the equipment cost, especially for facilities that have black start capability. These features can reduce the overall start-up time and can decrease the cost of starting the gas turbine. Start-up operating cost reduction can occur if starting on site fuel is available, instead of purchasing starting power from the power transmission system. It is to be appreciated, however, that the supercharging fan does not need to operate for gas turbine start-up unless applied as the starting means to accelerate the gas turbine until it is self-sustaining.

The supercharging fan 66,166 can be configured into different arrangements, for example, an axial, radial, mixed or cross flow impeller, turboprop propeller, turbofan or a propfan, with or without variable pitch. Moreover, the supercharging fan can be applied to either an aeroderivative or an industrial gas turbine shaft arrangement. The supercharging fan can be applied with a partial or full (maximize) heat recovery steam generator and integrated with either a simple cycle, combined cycle or combined heat and power cycle facility.

Thus, while in an exemplary embodiment the invention is applied to gas turbine generators, it is to be understood that the system and method of the invention can also be applied with equivalent effects on a shaft horsepower for gas turbine industrial drives applications or gas turbine propulsion applications; for example, gas pipeline compression stations or marine shipboard propulsion.

By providing a supercharging fan embodying the invention, it is possible to increase equipment shaft horsepower at high ambient temperature and/or higher altitude environmental conditions. It is also possible with the invention to improve gas turbine simple cycle efficiency. Likewise, a combined cycle is provided with better peaking efficiency over a base load combined cycle plant operating in conjunction with a simple cycle peaking plant.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inlet pressurization system for augmenting power produced by a gas turbine system of the type including a compressor for compressing air to produce compressed air, a combustor for heating said compressed air and producing hot gases, and a turbine for receiving said hot gases and converting the energy thereof to work for driving said compressor, for supplying a load, and for producing hot exhaust gases, said system comprising:

a working fluid supply;

a heat exchanger for receiving hot exhaust gases from said gas turbine for at least one of evaporating and superheating working fluid from said fluid supply to produce superheated working fluid;

a supercharging fan operatively coupled to said compressor for augmenting air supply to said compressor; and an apparatus for converting energy of said superheated working fluid to shaft power for driving said supercharging fan;

wherein said supercharging fan is a variable speed supercharging fan, and wherein the apparatus for driving the fan ramps the supercharging fan speed to a target fan speed determined as a function of at least one of gas turbine system power output and gas turbine shaft speed demand.

2. A system for augmenting power as in claim 1, wherein said supercharging fan has variable pitch blades.

3. A system for augmenting power as in claim 1, further comprising an assembly to cool airflow downstream of said supercharging fan and upstream of said compressor.

4. A system for augmenting power as in claim 3, wherein said assembly for cooling air comprises a refrigeration cycle including a compressor, a condenser, and a refrigeration evaporator cooling said air.

5. A system for augmenting power as in claim 4, wherein said refrigeration compressor is coaxial with and mounted to a common shaft of said supercharging fan for being driven by said apparatus for driving said fan.

6. A system for augmenting power as in claim 1, wherein said apparatus for driving said fan comprises a variable speed steam turbine drive for receiving superheated working fluid generated by said heat exchanger.

7. A system for augmenting power as in claim 6, further comprising a steam turbine speed governor for controlling working fluid input to said variable speed steam turbine drive, to thereby control the supercharging fan speed to a target fan speed set point.

8. A system for augmenting power as in claim 1, further comprising an assembly for cooling airflow from said supercharging fan.

9. A system for augmenting power as in claim 1, further comprising a refrigeration evaporator for cooling airflow from said supercharging fan.

10. A gas turbine system in combination with a gas turbine inlet pressurization assembly comprising:
   a compressor for compressing air to produce compressed air;
   a combustor for heating said compressed air and producing hot gases;
   a gas turbine for receiving said hot gases and converting the energy thereof to work for driving said compressor, for supplying a load, and for producing hot exhaust gases;
   a working fluid supply;
   a heat exchanger for receiving said hot exhaust gases from said gas turbine for at least one of evaporating and superheating working fluid from said fluid supply to produce superheated working fluid;
   a supercharging fan operatively coupled to said compressor for augmenting air supply to said compressor;
   an apparatus for converting energy of said superheated working fluid to shaft power for driving said supercharging fan; and
   an assembly for cooling airflow from said supercharging fan,
   wherein said supercharging fan is a variable speed supercharging fan, and
   wherein the apparatus for driving the fan ramps the supercharging fan speed to a target fan speed determined as a function of at least one of gas turbine system power output and gas turbine shaft speed demand.

11. The combination of claim 10, wherein said apparatus for driving said fan comprises a variable speed steam turbine drive for receiving superheated working fluid generated by said heat exchanger.

12. The combination of claim 11, further comprising a steam turbine speed governor for controlling steam input to said variable speed steam turbine drive.

13. A method for augmenting the power produced by a gas turbine system of the type having a compressor for compressing air to produce compressed air, a combustor for heating said compressed air and producing hot gases, and a turbine for receiving said hot gases and converting the energy thereof to work for driving said compressor, for supplying a load, and for producing hot exhaust gases, the method comprising:
   feeding a working fluid to a heat exchanger that receives said hot exhaust gases for at least one of the evaporating and superheating said working fluid;
   providing an assembly for converting energy of said superheated working fluid into mechanical shaft horsepower;
   driving a supercharging fan with said mechanical shaft horsepower to generate an airflow, the step of driving the fan including ramping the supercharging fan speed to a target fan speed determined as a function of at least one of gas turbine system power output and gas turbine shaft speed demand;
   cooling the airflow from said supercharging fan;
   directing said cooled airflow into said compressor thereby increasing the flow of air into the inlet of the gas turbine to increase power density through said gas turbine to produce more shaft horsepower; and
   further comprising varying fan speed to change shaft horsepower of the gas turbine while maintaining a nominal gas turbine firing temperature.

14. A method as in claim 13, further comprising cooling the airflow before said step of directing into said compressor.

15. A method as in claim 14, wherein said cooling includes using at least one of an inlet fogger, evaporative cooling, an electric chiller-refrigeration cycle, and a closed or open circuit water system.

16. A method as in claim 14, wherein the airflow is cooled by mixing a water spray directly into the supercharging discharge air.

17. A method as in claim 14, comprising using a refrigeration evaporator for cooling said air.

18. A method as in claim 13, wherein said assembly for converting steam energy to shaft work comprises a variable speed steam turbine drive and wherein the steam turbine is disposed on a common shaft to said fan for driving the same.

19. An inlet pressurization system for augmenting power produced by a gas turbine system of the type including a compressor for compressing air to produce compressed air, a combustor for heating said compressed air and producing hot gases, and a turbine for receiving said hot gases and converting the energy thereof to work for driving said compressor, for supplying a load, and for producing hot exhaust gases, said system comprising:
   a working fluid supply;
   a heat exchanger for receiving hot exhaust gases from said gas turbine for at least one of evaporating and superheating working fluid from said fluid supply to produce superheated working fluid;
   a supercharging fan operatively coupled to said compressor for augmenting air supply to said compressor;
   an apparatus for converting energy of said superheated working fluid to shaft power for driving said supercharging fan; and
   an assembly to cool airflow downstream of said supercharging fan and upstream of said compressor,
   wherein said assembly for cooling air comprises a refrigeration cycle including a compressor, a condenser, and a refrigeration evaporator cooling said air, and
   wherein said refrigeration compressor is coaxial with and mounted to a common shaft of said supercharging fan for being driven by said apparatus for driving said fan.

20. A gas turbine system in combination with a gas turbine inlet pressurization assembly comprising:
   a compressor for compressing air to produce compressed air;
   a combustor for heating said compressed air and producing hot gases;
   a gas turbine for receiving said hot gases and converting the energy thereof to work for driving said compressor, for supplying a load, and for producing hot exhaust gases;
   a working fluid supply;
   a heat exchanger for receiving said hot exhaust gases from said gas turbine for at least one of evaporating and superheating working fluid from said fluid supply to produce superheated working fluid;
   a supercharging fan operatively coupled to said compressor for augmenting air supply to said compressor;
   an apparatus for converting energy of said superheated working fluid to shaft power for driving said supercharging fan; and
   an assembly for cooling airflow from said supercharging fan,
   wherein said supercharging fan is a variable speed supercharging fan, and wherein said assembly for cooling air comprises a refrigeration cycle including a compressor, a condenser, and a refrigeration evaporator cooling said air, and wherein said refrigeration compressor is coaxial with and mounted to a common shaft of said supercharging fan for being driven by said apparatus for driving said fan.

21. A method for augmenting the power produced by a gas turbine system of the type having a compressor for compressing air to produce compressed air, a combustor for heating said compressed air and producing hot gases, and a turbine for receiving said hot gases and converting the energy thereof to work for driving said compressor, for supplying a load, and for producing hot exhaust gases, the method comprising:

feeding a working fluid to a heat exchanger that receives said hot exhaust gases for at least one of the evaporating and superheating said working fluid;

providing an assembly for converting energy of said superheated working fluid into mechanical shaft horsepower;

driving a supercharging fan with said mechanical shaft horsepower to generate an airflow;

cooling the airflow from said supercharging fan;

directing said cooled airflow into said compressor thereby increasing the flow of air into the inlet of the gas turbine to increase power density through said gas turbine to produce more shaft horsepower; and further comprising varying fan speed to change shaft horsepower of the gas turbine while maintaining a nominal gas turbine firing temperature, wherein said step of cooling the airflow from the supercharging fan comprises cooling the airflow using a refrigeration cycle including a compressor, a condenser, and a refrigeration evaporator and wherein said refrigeration compressor is mounted to a common shaft with said supercharging fan for being driven with said supercharging fan by said mechanical shaft horsepower.

\* \* \* \* \*